Patented Sept. 19, 1933

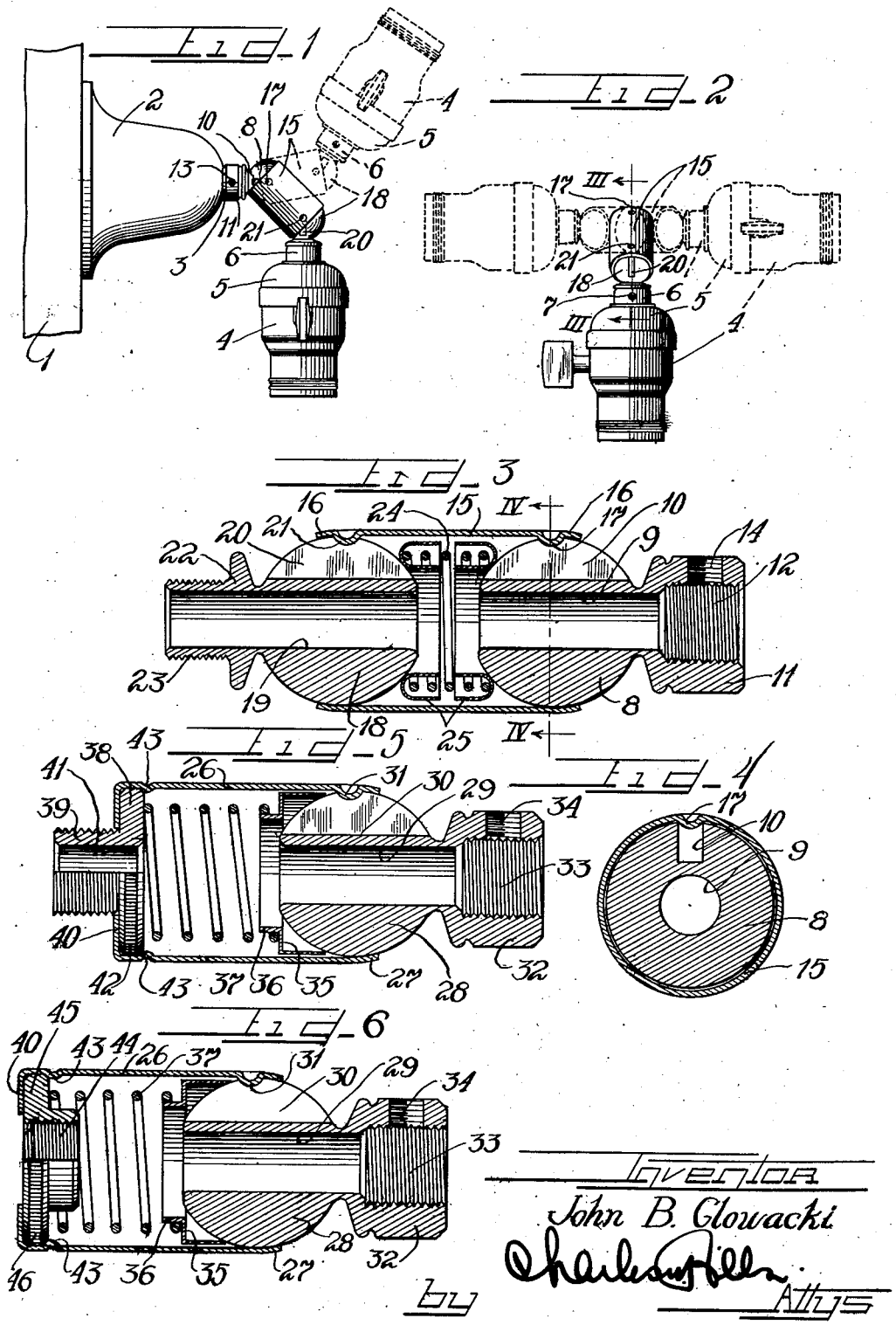

1,927,703

UNITED STATES PATENT OFFICE

1,927,703

NONTWISTABLE UNIVERSAL BALL AND SOCKET JOINT

John B. Glowacki, Chicago, Ill.

Application November 29, 1929
Serial No. 410,543

1 Claim. (Cl. 285—91)

This invention relates to a universal ball and socket joint and more particularly to a joint of this type in which the ball member is constructed to coact with the socket member in such a way that the ball member is prevented from rotating with respect to the socket member, thereby obviating twisting of the wires extending through the joint for connecting up electric light fixtures or similar equipment.

It is an object of this invention to provide a universal ball and socket joint or connector wherein the ball member is grooved to coact with a projection within the socket member to obviate rotation of the ball member with respect to the socket member, but permitting universal movement of the ball in the socket member, thereby providing a ball and socket joint of the universal type in which twisting of wires projecting through the ball and socket joint is obviated.

It is also an object of this invention to provide a universal ball and socket joint of the passaged type permitting wires to extend therethrough and having the ball and socket members coacting with one another in such a way that universal movement of the ball with respect to the socket is permitted, while rotation of the ball with respect to the socket is prevented, thereby obviating twisting of the wires.

Another object of the invention is to provide a universal ball and socket joint for use with electric light fixtures, said joint having a spring-controlled ball member grooved to coact with a projection within the socket member to prevent rotation of the ball member with respect to the socket member, but permitting universal movement of the ball member with respect to the socket member, so that wear or twisting of wires extending through the universal ball and socket joint is prevented.

It is furthermore an object of this invention to provide a universal ball and socket joint of either a single ball or multiple ball type wherein the members forming the joint are constructed to permit wires to pass longitudinally through the joint and wherein the ball members are grooved to coact with projections within the socket member to obviate rotation of the ball members with respect to the socket member, but permitting universal movement of the ball members without subjecting the wires to wear or strain when the universal joint is adjusted.

It is an important object of this invention to provide a non-twistable universal ball and socket joint for use in connection with electric light fixtures and the like by constructing the ball and socket members in such a way that they coact with one another allowing universal movement of the ball members with respect to the socket member, but preventing rotation of the ball members in the socket member so that no twisting or strains are imparted to electric wires or connections extending through the universal ball and socket joint.

Other and further important objects of this invention will be apparent from the disclosures in the specification and drawing.

The invention (in a preferred form) is illustrated in the drawing and hereinafter more fully described.

On the drawing:

Figure 1 is a side elevation of an electric light fixture having connected therewith an improved non-twistable universal ball and socket joint embodying the principles of this invention and illustrating the operation of the device in dotted lines.

Figure 2 is a top plan view of the device as illustrated in Figure 1 showing the operation in dotted lines.

Figure 3 is an enlarged longitudinal sectional view of the universal ball and socket joint taken on line III—III of Figure 2.

Figure 4 is a transverse detailed section of the joint taken on line IV—IV of Figure 3.

Figure 5 is a longitudinal sectional view of a modified form of universal ball and socket joint of the single ball type having a male attaching member engaged in one end of the socket.

Figure 6 is a longitudinal sectional view of another modified form of universal ball and socket joint of the single ball type wherein one end of the socket member is provided with a female attaching member to facilitate attachment to a male member forming part of an electric light fixture.

As shown on the drawing:

The reference numeral 1 indicates a wall or support having mounted thereon an electric light fixture comprising a hood or canopy 2 through which a stem 3 axially projects. The outer end of the stem 3, in the form of the device as illustrated, is of the male type and is externally threaded. Forming part of the fixture is an electric bulb-receiving socket 4, the cap 5 of which is provided with an internally threaded collar or neck 6 having a threaded aperture therein for the reception of a set-screw 7.

The electric light socket 4 is connected to the fixture stem 3 by means of an improved nontwistable double universal ball and socket joint embodying the principles of this invention and comprising a main or supporting ball member 8 provided with a diametric passage 9 and with a longitudinal groove or slot 10 on one side thereof. Integrally formed on the supporting or main ball member 8 is a female attaching shank or head 11 which is provided with an axial passage 12 which is internally threaded as illustrated in Figure 3, and is axially aligned with the passage 9 of the ball member 8. The female shank or attaching member 11 is adapted to be removably threaded onto the threaded outer end of the fixture stem 3 and is adjusted to be locked thereto by means of a set-screw 13 adapted to be engaged in a threaded passage 14 provided in the mounting shank 11, as clearly illustrated in Figure 3.

The primary or supporting ball 8 is engaged in one end of a double socket or sleeve 15, the ends of which are slightly deflected or curved inwardly, as at 16, to form a rim seat to prevent the ball from being pulled out of the end of the socket. Struck inwardly from the socket or sleeve 15 is a detent, tooth or projection 17 positioned to project into the groove 10 of the ball member 8. The projection or tooth 17, acting in the groove 10, serves to prevent rotation of the ball member 8 within the socket 15. The provision if the groove 10 within the ball member 8 and the tooth 17 in the socket 15 affords an arrangement whereby the ball member is permitted to have universal movement within the end of the socket 15, in addition to serving as a means for preventing rotation of the ball member circumferentially within the socket.

Engaged in the second end of the double socket or sleeve 15 is an auxiliary or secondary ball 18 provided with a diametric passage 19. The auxiliary ball 18 is also provided with a longitudinal groove or slot 20. Projecting into the second end of the double socket or sleeve 15 is a projection, tooth or pin 21, and, as illustrated in Figure 3, this tooth or projection is in the form of a detent struck inwardly from the double socket or sleeve 15. The tooth or projection 21 projects into the groove 20 and serves as a means for preventing rotation of the secondary or auxiliary ball 18 with respect to the double socket 15. Integrally formed on the outer projecting end of the auxiliary ball 18 is an axially passaged male shank or head 22 which is externally threaded at 23. The passage in the shank or head 22 is axially aligned and communicates with the passage 19 in the ball member 18. The secondary or auxiliary ball 18 is held within the second end of the double socket 15 by the outer edge of the socket which is deflected inwardly to afford a retaining rim or seat 16.

The threaded head or collar 6 provided on the cap 5 of the socket member 4 is adapted to be threaded onto the male shank 22 which is integrally former on the auxiliary or secondary ball 18. To hold the electric light socket in position against unthreading from the male member 22, the set-screw 7 is screwed into engagement with the male shank 22, thereby rigidly holding the socket cap 5 connected with the double universal ball and socket joint.

The two balls 8 and 18 disposed within the double socket member 15 are adapted to be resiliently held in seated engagement with the retaining rim or seat 16 by means of a spring-controlled mechanism disposed within the double socket 15. The spring-controlled mechanism comprises a coiled spring 24, the ends of which are seated in the grooves of a pair of U-cross-sectioned ring seats or followers 25, the open ends of which are directed inwardly, permitting the curved or rounded ends thereof to fit against the inner ends of the respective balls 8 and 18, as clearly illustrated in Figure 3.

The improved double ball universal joint illustrated in Figures 1 to 4, inclusive, is adapted to be connected between an electric light fixture stem and the electric light socket with the electric wires or conductors passing from the stem 3 through the ball members and the socket of the ball and socket joint and into the electric light socket 4 to be connected to the terminal screws or posts therein. By providing the ball members 8 and 18 with the longitudinal slots or grooves to coact with the pins or projections 17 and 21 within the double socket 15, the ball members 8 and 18 are held against rotation within the socket 15, thereby affording an arrangement preventing twisting or undue wear or strain being applied to the conductor wires extending through the universal ball and socket joint. The projections or pins 17 and 21 projecting into the grooves of the ball members 8 and 18, while preventing rotation of the ball circumferentially within the socket 15, nevertheless permit universal movement of the ball members in the ends of the socket, so that the electric light socket 4 at the outer end of the non-twistable universal ball and socket joint may be moved into any desired position without any danger of causing twisting of the wires or connectors projecting through the joint and connecting the electric light socket 4 with the stem 3 of the electric light fixture.

The modified form of non-twistable universal ball and socket joint illustrated in Figure 5 comprises a socket or sleeve 26 having one end thereof crimped or curled inwardly to afford a retaining rim or seat 27 in which a ball member 28 is movably seated.

The ball member 28 is provided with an axial passage 29 and with a longitudinal slot or groove 30. Struck inwardly from the socket or sleeve 26 near the end 27 thereof is a detent, pin or projection 31 which projects into the slot or groove 30 and serves as a means for preventing rotation of the ball 28 within the socket 26. The projection or tooth 31, while preventing rotation of the ball 28 peripherally within the socket 26, nevertheless permits the ball to be rocked and moved to afford a universal movement between the ball and the socket. Integrally formed on the outer end of the ball 28 is a female member, head or shank 32 provided with an internally threaded passage 33 which is axially aligned and connected up with the passage 29 of the ball member 28. An internally threaded radial opening or passage 34 is provided in the shank or head member 32 for the reception of a set-screw adapted to engage a threaded male member formed on an electric light socket to hold the socket connected with the universal ball and socket joint. Seated against the inner end of the ball member 28 within the socket 26 is a ring seat or follower 35 provided with a neck or rim 36 around which one end of a control spring 37 is engaged to resiliently hold the seat 35 against the inner end of the ball 28, thus resiliently holding the ball member in contact with the seat or rim 27 at the end of the socket 26. The outer end of the control spring 37 seats against the inner end or flange 38 of a male coupling member or shank 39 which is externally threaded and projects through an opening afforded by an end flange 40 which is integrally formed at the second end of the socket 26. The coupling member 39 is provided with an axial passage 41 which extends inwardly through the inner head or flange member 38 of the coupling or connector. The peripheral surface of the flange 38 is knurled at 42, so that, when the connector or coupling 39 is forced into the end of the socket 26 before the flange 40 is bent over, the ribs forming part of the knurling serve to cut into the inner face of the socket 26 to hold the connector or coupling 39 against rotation in the end of the socket 26. The socket or sleeve 26 is struck inwardly at a plurality of points adjacent the inner end of the flange 38 to afford a plurality of inwardly directed teeth or indents 43 to serve as stops for the inward movement of the connector or coupling 39. The male connector or coupling 39 is adapted to be screwed into a female member provided at the outer end of an electric light fixture stem to hold the improved universal ball and socket joint connected with the fixture and permitting the wires from the fixture stem to project through the coupling 39 and through the socket 26 and out of the opposite end of the joint through the ball member and the head formed thereon so that the wires may be projected into the electric bulb socket forming part of the fixture. The improved joint illustrated in Figure 5 affords a universal joint between an electric light socket and a fixture stem, permitting the socket to be moved in different directions with respect to the socket member 26, but affording an arrangement whereby rotation of the ball 28 in the socket 26 is prevented so that no twisting strains or stresses will be applied to the connectors or wires passing through the joint from the fixture stem to the electric light socket connected at the outer end of the joint.

Figure 6 illustrates another modified form of non-twistable universal ball and socket joint of a construction similar to that illustrated in Figure 5 in which the parts which are similar to those illustrated in Figure 5 are indicated by the same reference numerals. In the form of joint illustrated in Figure 6, a female connector or coupling is provided in the end of the socket 26, and said connector comprises an internally threaded sleeve or shank 44 provided with an integral flange or rim 45, the outer peripheral surface of which is knurled at 46. The female connector 44 is forced into the end of the socket 26 before the retaining flange 40 is bent over, thereby causing the ribs forming the knurling 46 to cut into the inner surface of the socket to hold the connector against rotation within the socket. The detents or projections 43 provided in the socket 26 limit the inward movement of the connector 44. The control spring 37 within the socket 26 is engaged around the inner end of the connector 44 and resiliently holds the follower or seat member 35 in contact with the inner end of the ball member 28 to resiliently hold said ball member engaged in the socket seat 27.

While the two ball members of the joint illustrated in Figures 5 and 6 are provided with female connectors or heads on the ball members, it will, of course, be understood that said female members may be replaced by male connectors or shanks adapted to have female members of electric light sockets secured thereto if desired. In a similar manner, the ball members of the joint illustrated in Figures 1 to 4 may have either male or female members formed thereon, depending on the type of electric light fixture on which the joint is to be used.

While the improved non-twistable universal ball and socket joints hereinbefore described have been described in connection with electric light fixtures, it will, of course, be understood that said joints may be used in other combinations in which connectors or wires are adapted to be engaged through the joint and where it is desired to eliminate all twisting or strains being applied to the wires or connectors.

It will, of course, be understood that many details of construction may be varied through a wide range without departing from the principles of this invention, and it is, therefore, not purposed to limit the patent granted thereon otherwise than necessitated by the scope of the appended claim.

I claim as my invention:

A non-twistable joint comprising a pair of ball members each provided with a groove, a socket member arranged receiving said ball members for universal movement of said ball members in said socket and being provided with means entering the grooves to limit movement of said balls in one direction of movement, a coiled spring interposed between said balls, and a pair of oppositely directed cups arranged housing the ends of said spring and engaging said ball members.

JOHN B. GLOWACKI.